Aug. 29, 1967     W. C. TAYLOR ETAL     3,338,363
ORIENTING DEVICE
Filed March 25, 1966     3 Sheets-Sheet 1

Inventors
William C. Taylor
George J. Gardner
Gerald R. Grapzicis
Dominik & Stein
Att'ys Aug. 29, 1967 W. C. TAYLOR ETAL 3,338,363
ORIENTING DEVICE
Filed March 25, 1966 3 Sheets-Sheet 2
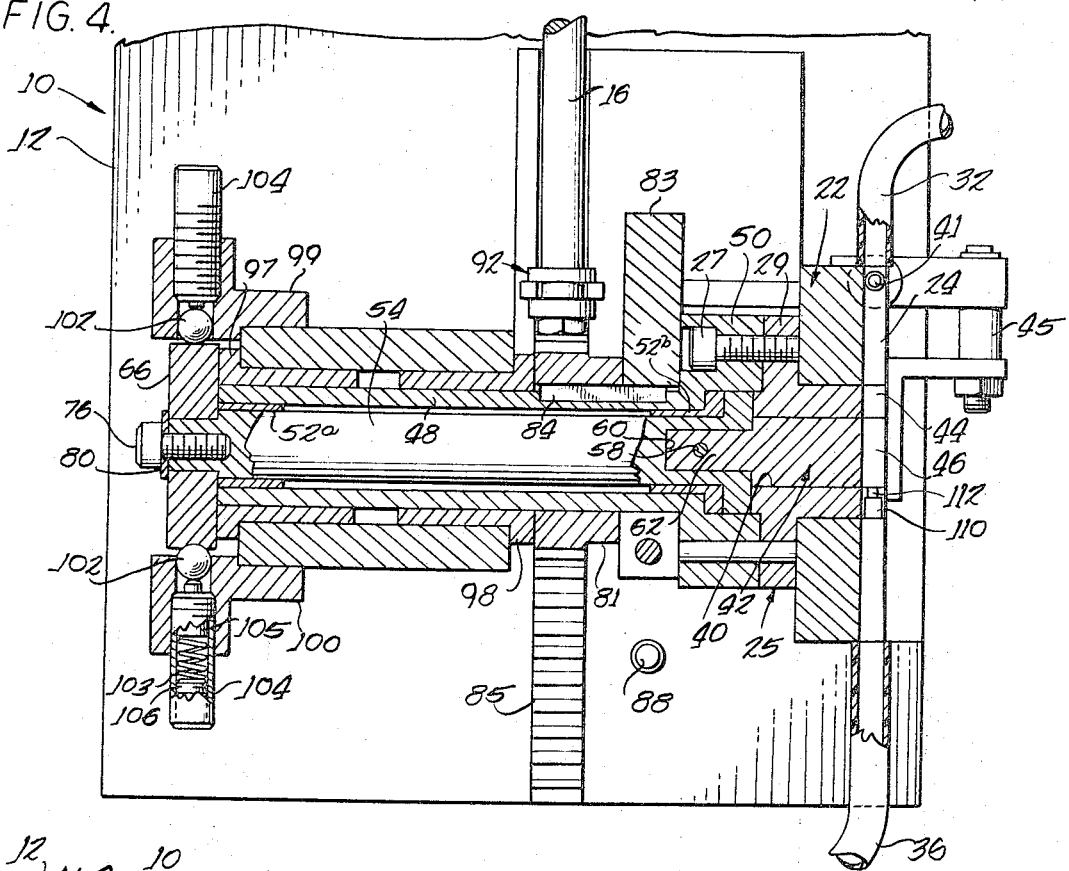
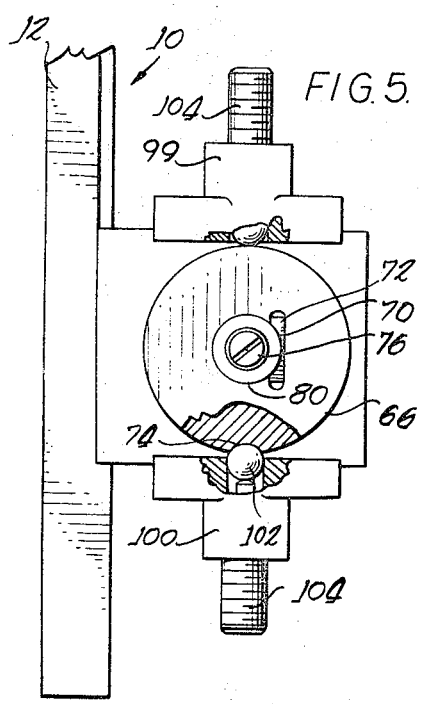
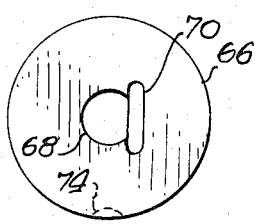
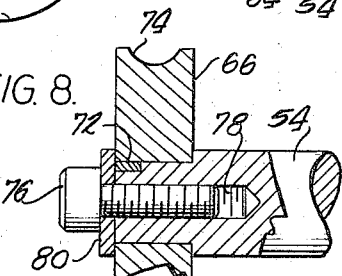
Inventors
William C. Taylor
George J. Gardner
Gerald R. Grapius
Dominik & Stein
Atty's Aug. 29, 1967   W. C. TAYLOR ETAL   3,338,363
ORIENTING DEVICE
Filed March 25, 1966   3 Sheets-Sheet 3
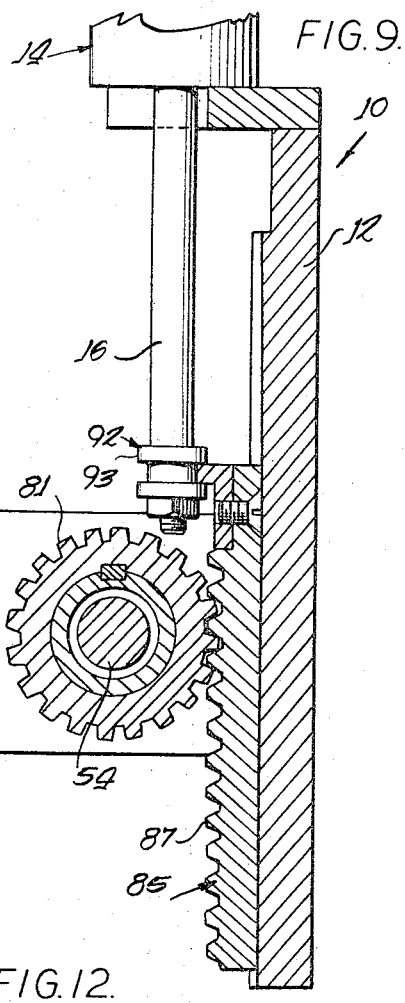
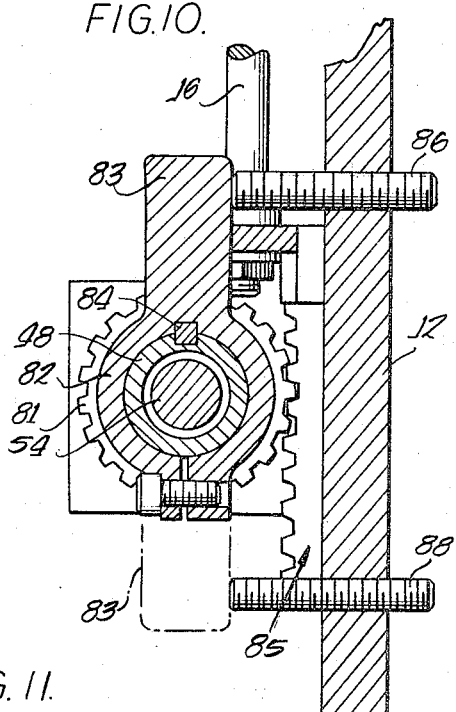
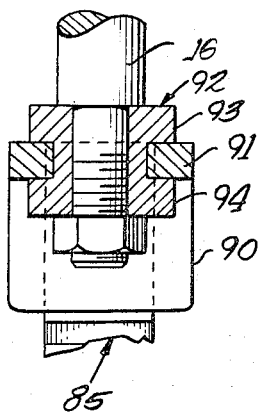
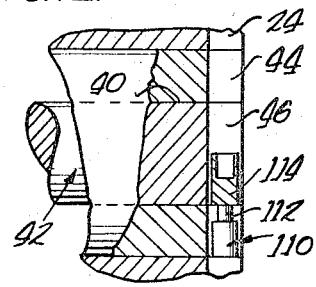
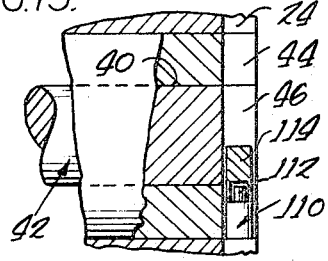
Inventors
William C. Taylor
George J. Gardner
Gerald R. Grapius
Dominik & Stein
Atty's United States Patent Office 3,338,363
Patented Aug. 29, 1967

3,338,363
ORIENTING DEVICE
William C. Taylor, Waterford, George J. Gardner, Fairview, and Gerald R. Grafius, Erie, Pa., assignors to Automation Devices, Inc., Erie, Pa., a corporation of Pennsylvania
Filed Mar. 25, 1966, Ser. No. 537,482
8 Claims. (Cl. 193—43)

This invention relates to orienting devices and, more particularly, to apparatus for feeding articles of manufacture having dissimilar ends in such manner that the corresponding end of each article is always in the same direction.

In U.S. Patent 2,961,080, there is disclosed apparatus which automatically detects and reverses articles so that the articles are oriented properly, and can be fed in a continuous fashion to another station. While the disclosed apparatus functions extremely well in the intended manner and has enjoyed considerable commercial success, it has been found that it can be improved, in at least several respects. For example, if an article becomes lodged in the apparatus, the apparatus has to be disassembled to remove the article. Thereafter, it must be reassembled and re-aligned. It can be appreciated that this is a time consuming and costly operation, since the apparatus is shut down and, in addition, considerable labor costs are incurred to repair it.

It is, therefore, an object of the present invention to provide improved apparatus for detecting and properly orienting articles having dissimilar ends. More specifically, it is an object to provide improved apparatus of the described type constructed in a manner such that articles lodged therein can be easily and quickly removed.

A further object is to provide such apparatus having adjustable detent locking means for the inner rotor of the apparatus whereby machining and assembly errors can be easily and quickly compensated for.

A still further object is to provide apparatus of this type having means for compensating for misalignment of the driving mechanism with the apparatus.

Another object is to provide apparatus for detecting and properly orienting articles which can be easily and quickly aligned. In this respect, it is further contemplated that the apparatus be simple in construction, and simple and efficient in operation.

Other objects of the invention will in part be obvious and will in part appear hereinafter.

The above objectives are accomplished with apparatus which, generally, includes a fixed rotor retaining block which has a rotor retaining bore in it and a vertically disposed slot or groove through which parts can pass formed in its front wall, in vertical alignment with the centerline or axis of the rotor retaining bore. An outer and inner rotor are retained within the rotor retaining bore, and each of them has a corresponding diametrically disposed slot or groove formed in its end which can be aligned with one another and with the groove in the rotor retaining block to form a continuous channel. These grooves are exposed on an exterior surface of the apparatus and a removable cover plate is affixed to the apparatus to partially close the grooves so that a part is retained in and can pass through the grooves, or channel. Since the grooves, or channel, are partially exposed, a part can be easily observed while traversing the channel, and if a part becomes lodged therein it is readily detectable. The part is easily and quickly removed, simply by removing the cover plate.

Also, the inner rotor and outer rotor are rotatable with respect to one another, between predetermined positions. At each of these extreme positions, the grooves therein must be perfectly aligned. Machining errors in forming the grooves, and the stops controlling the limits of rotation of the rotors are adjustable to assume proper alignment. In particular, the rotation of the inner rotor is controlled by a ball and detent wheel arrangement, and proper alignment is assured by providing two detent ball holders each of which is independently adjustable to compensate for machining and alignment errors.

Alignment errors between the driving mechanism and a driven gear rack for the apparatus is compensated for by providing a loose coupling, rather than a fixed coupling between them.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings, in which:

FIG. 4 is a sectional view, taken along lines 4—4 of FIG. 3;

FIG. 5 is a plan view of the rear of the apparatus of FIG. 1, partially sectionized to illustrate the detent locking arrangement of the inner rotor;

FIG. 6 is a plan view of the inner rotor detent wheel;

FIG. 7 is a partial view, illustrating one end of the inner rotor shaft;

FIG. 8 is a partial, sectionized view illustrating the connection between the inner rotor shaft and the inner rotor detent wheel;

FIG. 9 is a sectional view, taken along lines 9—9 of FIG. 1;

FIG. 10 is a sectional view, taken along lines 10—10 of FIG. 1;

FIG. 11 is a view, partially sectionized, illustrating the adjustable connection between the driving mechanism and the drive rack for the apparatus; and FIGS. 12 and 13 are views, partially sectionized, illustrating an improper oriented article and a properly oriented article, respectively, in the apparatus.

Similar reference characters refer to similar parts throughout the several views of the drawings.

Figure 1:
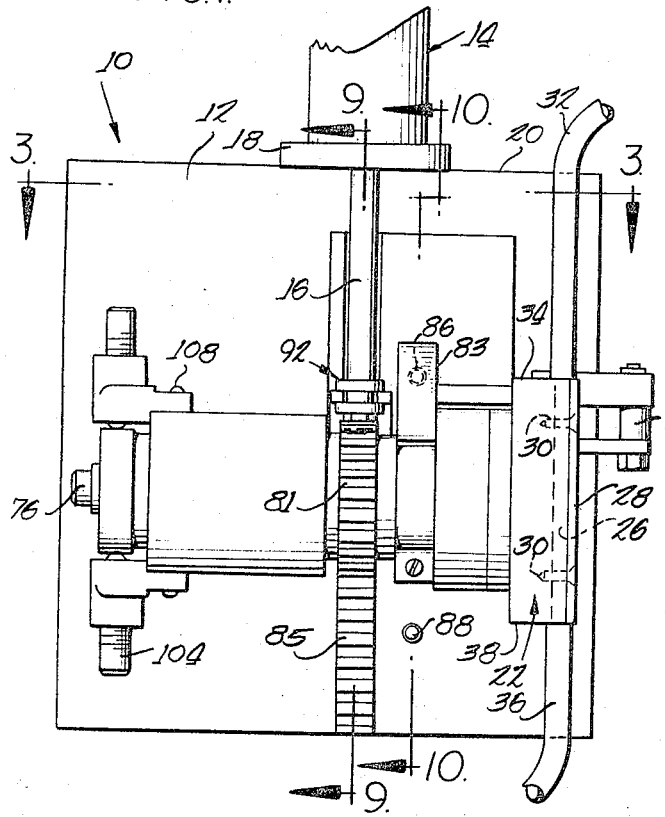
FIG. 1 is a side plan view of apparatus exemplary of the invention.
Figure 2:
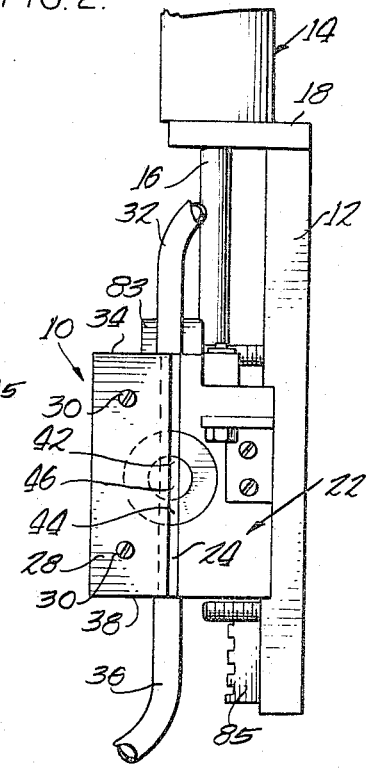
FIG. 2 is a plan view of the front of the apparatus of FIG. 1.

Referring now to the drawings, in FIG. 1 apparatus 10 is shown which is particularly adapted to detect and orient articles which have a configuration having no reference point or reference area which can be utilized to detect which end of the article is headed in a forward direction but which must be oriented in a particular manner to be usable at a subsequent station. The apparatus 10 has a rotor retaining block 22 which is fixedly secured to a plate 12 and has a rotor receiving bore 23 (FIG. 4) extending laterally through it for supporting an outer rotor 25. A groove 24 which is vertically disposed to extend along the vertical axis of the bore 23 is formed in a front wall 26 of the block 22. A cover plate 28 is removably affixed by means of fasteners such as the threaded screws 30 to the front wall 26, in a position so as to close and conceal approximately one half of the groove 24. A feed tube 32 into which parts are fed is affixed a top wall 34 of the block 22 in vertical alignment with the groove 24, and a discharge tube 36 is correspondingly aligned and affixed to a bottom wall 38 of the block 22. The parts, after being oriented, are discharged through the discharge tube to a suitable repository or to a machine whereon they are used.

Figure 3:
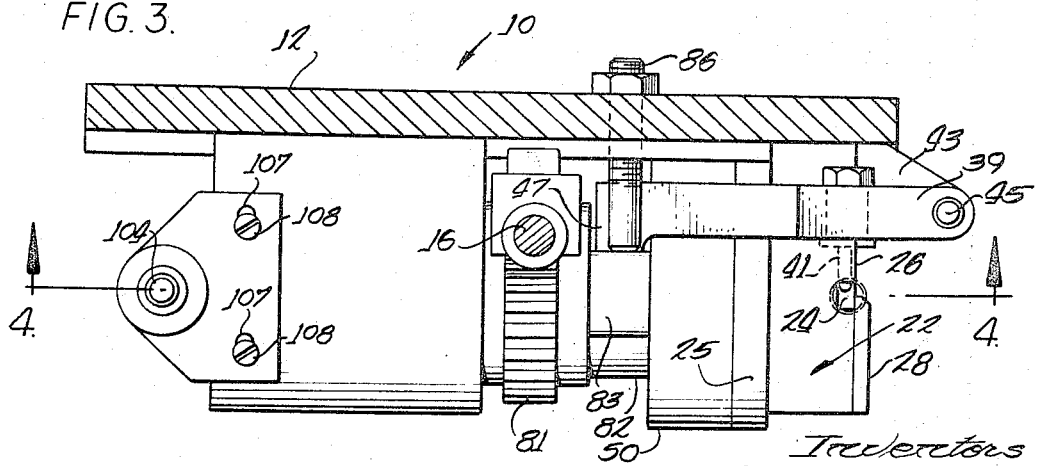
FIG. 3 is a sectional view, taken along lines 3—3 of FIG. 1, to illustrate the top plan view of the apparatus.

An escapement arm 39 having an escapement pin 41 affixed to it is pivotally secured by means of a pivot hinge 43 and a pivot pin 45 to the front wall 26 of the block 22. The escapement pin 41 extends through an aperture (not shown) in the block 22, into the groove 24. When in the position shown in FIG. 3, the escapement pin 41 blocks the groove 24 and prevents parts from passing through the groove. The end 47 of the escapement arm 39 abuts against and is intermittently operated to withdraw the escapement pin 41 from the groove 24 to allow a part to pass through the groove 24, by a stop arm 82 described more fully below.

The outer rotor 25 has a laterally extending bore 40 formed in it, and an inner rotor 42 is rotatably supported therein. The outer rotor 25 and the inner rotor 42 have diametrically disposed grooves 44 and 46 formed in the ends thereof, respectively, and the rotors 25 and 42 are positioned with respect to one another and to the rotor retaining block 22 so that the grooves 44 and 46 therein are normally aligned with the groove 24 in the rotor retaining block 22.

A cylindrical shaped outer spindle 48 having an enlarged diameter portion 50 at its one end is fixedly secured to the outer rotor 25, by means of threaded bolts 27 extended through apertures formed in the enlarged diameter portion 50 and received within correspondingly aligned apertures in an enlarged diameter flange 29 of the outer rotor 25. Cylindrical shaped bearings 52a and 52b are retained within the outer spindle 48 and rotatably support a similar shaped inner spindle 54. The inner rotor 42 has a reduced diameter end portion 56 which is received and fixedly secured, by a set screw 58, within a correspondingly shaped bore 60 formed in the end of the inner spindle 54.

The opposite end of the inner spindle 54 has a reduced diameter portion 61 forming a shoulder 64 against which a detent wheel 66 abuts, when fixedly secured to the inner spindle 54. The detent wheel 66, as can be best seen in FIGS. 6–8, has an aperture 68 centrally formed therein, a key slot 70 alongside the aperture for a key 72 and a detent 74 in its peripheral edge. The inner spindle 54 has a flat 77 which is engaged by the key 72, when the detent wheel is fitted to the inner spindle, as shown in FIG. 8. The detent wheel 66 is removably affixed to the inner spindle 54 and the key 72 is held in the key slot 70 by means of a washer 80 and a threaded bolt 76 which is extended through the washer 80 and received within a correspondingly threaded aperture 78 in the end of the inner spindle.

A gear 81 and the stop arm 82 are fixedly secured to the outer spindle 48, by means of a key 84 which is received in correspondingly shaped key slots formed in each of these members. The gear 81 is engaged and rotated by a gear rack 85 having gear teeth 87 which is affixed to and reciprocally operated upwardly and downwardly by a piston 16 of an air cylinder 14. The gear 81, in turn, rotates the outer spindle 48 and the stop arm 82, in a manner described below.

The air cylinder 14 is mounted to a support 18 affixed to the top edge 20 of the plate 12 and may be of a conventional type having proper valves thereon to cause its piston to move upwardly and downwardly intermittently. The piston of the air cylinder 14 may be actuated by a circuit such as shown in FIG. 6 of U.S. Patent 2,728,322. It should also be understood that while an air cylinder is illustrated for operating the apparatus 10, a motor having suitable rotation and cam mechanism or any other suitable driving apparatus can be substituted for the air cylinder.

A pair of pins 86 and 88 (FIG. 10) are threadedly received in apertures formed in the plate 12 and are adjustable to limit the rotation of the outer spindle 48 to provide proper alignment between the groove 44 in its end and the groove 24 in the rotor retaining block 22, as the outer spindle is rotated from its one extreme position to its other. The pins 86 and 88 are engaged by a stop 83 on the stop arm 82 as the latter is rotated with the outer spindle 48.

A substantially L-shaped coupler 90 is affixed to the end of the rack 85 and has one leg 91 formed to engage between a pair of enlarged diameter portions 93 and 94 of a collar 92 affixed to the end of the piston 16, to thereby loosely couple the rack to the piston. The loose coupling compensates for misalignment between the driving mechanism and the rack 85, so that proper alignment is not now as critical, as it was in the past, using a fixed coupling arrangement.

A bearing block 95 is affixed to the plate 12 and has a central lateral bore 96 in which are received two bearings 97 and 98 for rotatably supporting the outer spindle 48. Affixed atop and below the bearing block 95 are detent ball holders 99 and 100, each of which includes a ball 102 and a spring 103 for biasing the ball against the peripheral edge of the detent wheel 66. The springs 103 are retained within screws 104 threadedly received in apertures formed in the holders 99 and 100 and forcibly urge plugs 105 against the balls. A set screw 106 can be provided in the end of the screws 104, for complete adjustability to provide proper biasing. Other arrangements can be used, also. The holders 99 and 100 each have elongated apertures 107 (FIG. 3) formed therein, through which fastening means such as the threaded bolts 108 are extended to affix them to the bearing block 94. The pair of holders 99 and 100 provide adjustability for compensating for machining errors so that the rotation of the inner spindle 54 and hence the inner rotor 42 can be controlled to assure proper alignment of the grooves 46 and 48 in the inner rotor 42 and the outer rotor 25, respectively, in a manner which will be more apparent from the description which follows.

A receiving pin 110 having a pintle 112 on one end thereof which is suitably shaped to enter one end of a part 114 but will not enter the other is removably secured within the groove 44 in the outer rotor 25 so that the end of the pintle is flush with the inner surface of the bore 40 formed in the outer rotor.

With this construction, when a part 114 is released by the escapement pin 41 it drops through the channel formed by the grooves 24, 44 and 46 and engages the receiving pin 110. If the part is turned in a direction so that the closed end thereof engages the receiving pin 110, as illustrated in FIG. 12, it will rest on top of the end of the pintle 112. When the rack 85 is moved downwardly by the action of the air cylinder 14, the gear 81 and hence the outer spindle 48 and the outer rotor 25 affixed to it is rotated. The inner rotor 42 remains stationary. The part 114 also remains in the position shown in FIG. 12, since it will ride on the inner surface of the bore in the outer rotor 25, as the latter is rotated. The outer rotor 25 is rotated until the stop 83 on the stop arm 82 engages the pin 88, thereby preventing the gear 81 and hence the outer spindle 48 and the outer rotor 25 from rotating further. At this point, the opposite end of the groove 44 in the outer rotor 25 should again be in vertical alignment with the groove 46 in the inner rotor 42, and the part 114 will drop through the groove 44 into the discharge tube 36. The pin 88 accordingly is adjusted to assure that the grooves 44 and 46 are in alignment, when it is engaged by the stop 83 on the stop arm 82. On the upward stroke of the rack 85, the outer spindle 48 and the outer rotor 42 are rotated in the opposite direction, until the stop 83 engages the pin 86. The pin 86 is, therefore, accordingly adjusted to assure that, in this position, the groove 44 is aligned with the groove 24 in the rotor retaining block 22.

It may be observed that the stop 83, prior to engaging the pin 86, engages and operates the escapement arm 39 to retract the escapement pin 41 from the groove 24, to thereby allow another part to drop through the channel formed by the grooves 24, 44 and 46. The outer rotor 25 is in its initial starting position, hence the channel is again blocked by the receiving pin 110 and the part engages and is prevented from dropping further by the pin.

Assuming that the subsequent part is faced in the direction illustrated in FIG. 13, with its recessed end leading, it will seat on the pintle 112 of the receiving pin 110, effectively keying the inner and outer rotors 42 and 25 to one another. Therefore, when the outer rotor 25 is rotated in the above described manner, the inner rotor 42 is forced to rotate along it. The part 114, being retained within the groove 46 in the inner rotor 42, is reversed and when the grooves 44 and 46 are aligned with the groove 24 in the rotor retaining block 22 the part will fall through it and into the discharge tube 36.

When the outer rotor 25 is thereafter counter-rotated to its initial starting position, it may be noted that the inner rotor 42 remains in the same position since it is no longer keyed to the outer rotor. The detent wheel 66 is rotated along with the inner rotor 42 and assures that the groove 46 in the inner rotor 42 is maintained in alignment with the grooves 24 and 44. When the inner rotor 42 is rotated, one of the balls 102 engages the detent 74 in the detent wheel 66 in each of the two positions, and maintains the inner rotor 42 in a fixed position so that the groove 44 therein cannot become misaligned. Also, in the event the detent 74 is not exactly in alignment with the groove 44 so that the inner rotor is maintained in proper position for alignment, the ball holders 99 and 100 each can be individually adjusted by loosening the screws 106 to position the balls 102 to fall in the detent 74 when the inner rotor is properly positioned. Being individually adjustable, machining errors and the like can be easily and quickly compensated for.

If in traversing the channel formed by the grooves 24, 44 and 46 a part becomes lodged therein, it can be easily detected by observing the flow of parts through the open slot formed by the cover plate 28, and removed by simply removing the cover plate. The apparatus therefore no longer has to be disassembled to remove the part, or realigned afterwards so that down-time of the apparatus is virtually eliminated.

It is apparent that objects having projections on their ends can be detected and oriented also. For example, an object may be rectangular or cylindrical in shape and have a reduced diameter portion on one end thereof. In such a case, the outer rotor 25 has a pin having a recessed cavity in it which is adapted to receiving the reduced diameter portion on the object, to lockingly engage the inner and outer rotors together for rotation. If the object is properly oriented, it will seat on the pin, in the manner described above, so that the inner rotor 42 remains stationary. Other objects having only a beveled corner on one end thereof can likewise be detected and oriented. Accordingly, the apparatus 10 can be used to orient virtually any object as long as it has some type of end to end differential, either internal or external, merely by providing a pin of proper construction.

It will thus be seen that the objects set forth above, among those made apparent from the preceding description, are efficiently attained and, since certain changes may by made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements, of the scope of the invention, which, as a matter of language, might be said to fall therebetween.

Now that the invention has been described, what is claimed as new and desired to be secured by Letters Patent is:

1. An orienting device comprising a body having a front wall and a bore extending therethrough, an outer rotor having an axial bore therein rotatably retained in said bore in said body, an inner rotor rotatably retained in said axial bore in said outer bore, an open groove formed in the front wall of said outer body and an open groove in the end of said outer and inner rotor, respectively, aligned with said open groove in said front wall, said open grooves forming a channel through which articles move and which is open to the exterior of said device, channel blocking means on said outer rotor preventing articles from moving through said channel, means for rotating said outer rotor around said inner rotor to a discharge position to allow said articles to move through said channel without being reoriented or rotated, said channel blocking means on said outer rotor engaging said articles when misaligned and said articles locking said inner and outer rotors together therein and said misaligned articles are oriented, said channel permitting said articles to be observed while moving through said device, whereby articles which become lodged therein while moving through said channel can be dislodged, aligned and removed without having to disassemble, assemble and realign said device.

2. The orienting device of claim 1 wherein said grooves forming said channel are vertically disposed and said orienting device further includes a cover plate removably affixed to said front wall partially closing said channel.

3. The orienting device of claim 1 further including detent means for holding said inner rotor against rotation when said articles are properly oriented, said detent means comprising a detent wheel having a detent formed in the peripheral edge thereof and a pair of detent engaging means, each adapted to engage said detent to align said groove in said inner rotor with said groove in said body and said outer rotor and each individually adjustable whereby machining errors and the like can be compensated for to assure proper alignment.

4. The orienting device of claim 1 wherein said means for rotating said outer rotor comprises gear means coupled thereto, a rack engaging said gear, motor means coupled to said rack for intermittently moving said rack in a first and a second direction to rotate said outer rotor to bring said groove therein into alignment with said groove in said body in one direction and to rotate said outer rotor 180° to bring said groove into alignment in the other direction.

5. The orienting device of claim 4 further including an outer spindle fixedly secured to said outer rotor and having an axial bore therein, said gear means being coupled to said outer spindle for rotating said outer spindle and said outer rotor, a stop arm affixed to and rotated by said outer spindle, and a pair of stops engaged by said stop arm for limiting the rotation of said outer spindle and said outer rotor, said pair of stops being individually adjustable to align said groove in said outer rotor with said groove in said body in one of said directions of alignment, respectively.

6. The orienting device of claim 5 further including an escapement arm having an escapement pin affixed thereto, said escapement arm being pivotally affixed to said body with said escapement pin extending into said groove in said body to prevent articles from moving through said groove, the end of said escapement arm being engaged and intermittently operated by said stop arm to withdraw said escapement pin from said groove to permit individual ones of said articles to move through said groove.

7. The orienting device of claim 4 wherein said motor means includes a rod having a collar affixed to its end, said collar having a pair of spaced apart enlarged diameter flanges, and wherein said rack has a substantially L-shaped member affixed to its end having one leg which is forked and adapted to engage about said collar and between said flanges to loosely couple said rod and said rack, whereby said coupling compensates for alignment errors.

8. The orienting device of claim 5 further including an inner spindle rotatably retained within said axial bore in said outer spindle and coupled to and rotated by said inner rotor, detent means for holding said inner spindle and said inner rotor against rotation when said articles are properly oriented, said detent means comprising a detent wheel affixed to said inner spindle having a detent formed in the peripheral edge thereof and a pair of detent engaging means, each adapted to engage said detent to align said groove in said inner rotor with said groove in said body and said outer rotor and each individually adjustable whereby machining errors and the like can be compensated for to assure proper alignment.

References Cited

UNITED STATES PATENTS

| | | | |
|---|---|---|---|
| 2,759,631 | 8/1956 | Ervine | 221—298 |
| 2,840,222 | 6/1958 | Palmer | 193—43 |
| 2,845,164 | 7/1958 | Stahl | 193—43 |
| 2,961,680 | 11/1960 | Smith | 193—43 |
| 3,011,613 | 12/1961 | Vilmerding | 193—43 |

EVON C. BLUNK, *Primary Examiner.*

H. C. HORNSBY, *Assistant Examiner.*